(12) United States Patent
Miyazawa

(10) Patent No.: US 7,248,417 B2
(45) Date of Patent: Jul. 24, 2007

(54) ZOOM LENS AND IMAGING APPARATUS INCLUDING THE SAME

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/393,187

(22) Filed: Mar. 29, 2006

(65) Prior Publication Data

US 2006/0227429 A1    Oct. 12, 2006

(30) Foreign Application Priority Data

Apr. 11, 2005    (JP) ............................. 2005-113465

(51) Int. Cl.
   *G02B 15/14*    (2006.01)
   *G02B 13/18*    (2006.01)
   *G02B 9/34*    (2006.01)

(52) U.S. Cl. ..................... 359/686; 359/715; 359/774

(58) Field of Classification Search ............... 359/554, 359/557, 684–687, 715, 740, 774; 396/52; 348/208.99

See application file for complete search history.

(56) References Cited

U.S. PATENT DOCUMENTS

| | | | |
|---|---|---|---|
| 5,189,558 A | | 2/1993 | Ishii |
| 5,583,697 A | * | 12/1996 | Mukaiya ..................... 359/687 |
| 5,612,825 A | * | 3/1997 | Horiuchi et al. ............ 359/687 |
| 5,638,216 A | * | 6/1997 | Horiuchi et al. ............ 359/683 |
| 5,978,152 A | * | 11/1999 | Okayama et al. ........... 359/687 |
| 6,441,968 B1 | | 8/2002 | Okayama |
| 6,580,565 B2 | * | 6/2003 | Ozaki ......................... 359/687 |
| 6,606,194 B2 | * | 8/2003 | Hamano et al. ............. 359/557 |
| 6,751,029 B2 | | 6/2004 | Horiuchi |
| 7,133,214 B2 | * | 11/2006 | Hoshi ......................... 359/687 |
| 2003/0227691 A1 | * | 12/2003 | Saruwatari .................. 359/687 |
| 2004/0156120 A1 | * | 8/2004 | Yoneyama ................... 359/680 |
| 2006/0132928 A1 | * | 6/2006 | Nakatani et al. ............ 359/687 |
| 2006/0146420 A1 | * | 7/2006 | Yamada ....................... 359/686 |
| 2006/0193061 A1 | * | 8/2006 | Yoshitsugu .................. 359/687 |

FOREIGN PATENT DOCUMENTS

| | | |
|---|---|---|
| JP | 5-027167 A | 2/1993 |
| JP | 11-202198 A | 7/1999 |
| JP | 2000-121941 A | 4/2000 |
| JP | 2003-295053 A | 10/2003 |

* cited by examiner

*Primary Examiner*—Scott J. Sugarman
*Assistant Examiner*—DaWayne A Pinkney
(74) *Attorney, Agent, or Firm*—Canon U.S.A. Inc. I.P. Div

(57) ABSTRACT

At least one exemplary embodiment is directed to a zoom lens which includes a first lens group, which can have a positive refracting power; a second lens group, which can have a negative refracting power, and can move during zooming; a third lens group, which can have a positive refracting power; and a fourth lens group, which can have a positive refracting power, and can move during zooming, the lens groups being aligned in order from front to back, where the focal lengths fw and ft of the whole system at a wide-angle end and at a telescopic end, respectively, can satisfy the following conditions:

$$0.15 < fw/f4 < 0.26$$

$$1.0 < f3/(fw \cdot ft)^{1/2} < 1.2.$$

9 Claims, 7 Drawing Sheets

ZOOM LENS AND IMAGING APPARATUS INCLUDING THE SAME

BACKGROUND OF THE INVENTION

1. Field of the Invention

The present invention relates to zoom lenses, more particularly, though not exclusively, the present invention relates to zoom lenses that can be used as image-taking lenses in imaging apparatuses.

2. Description of the Related Art

In optical imaging systems used for imaging apparatuses such as video cameras using solid-state image-pickup devices, digital still cameras, and silver-salt film cameras using silver-salt films, the desirability of compact-system zoom lenses having optical performance of high resolution have increased.

Since video cameras capable of recording still images of high definition have also been increasingly required, the desirability of lens systems that are compact yet having high-optical performance have increased.

One such zoom lens system that can be used includes four lens groups consisting of a first lens group having a positive refracting power, a second lens group having a negative refracting power, a third lens group having a positive refracting power, and a fourth lens group having a positive refracting power, the lens groups being aligned in order from (the anterior position adjacent to) an object side to an image side (the posterior position adjacent to an image taking side). This zoom lens is known as a four-group zoom lens of a so-called rear-focus type in which the second lens group moves so as to change magnification and the fourth lens group adjusts the focus while correcting and/or reducing image-plane fluctuations generated by the magnification changes. Such a zoom lens is discussed in Japanese Patent Laid-Open Nos. 08-304700, 2000-121941, and 2003-295053.

Zoom lenses of the rear-focus type are characterized by small driving power for lens groups and rapid focusing since the lens groups that move to focus are equivalently small and lightweight.

In such zoom lenses of the rear-focus type, a compact zoom lens including a minimum number of lenses has been discussed in Japanese Patent Laid-Open No. 05-027167 and U.S. Pat. No. 6,441,968.

A zoom lens discussed in Japanese Patent Laid-Open No. 05-027167 has a structure that can be used for ⅓-inch and ¼-inch image-pickup devices. In particular, the number of lenses can be reduced by using a plurality of aspherical lenses.

In Japanese Patent Laid-Open No. 05-027167, chromatic aberration may not be sufficiently corrected since the fourth lens group includes only one positive lens. Therefore, a zoom ratio up to 8 times causes no problem, but a zoom ratio higher than or equal to 20 times can lead to large fluctuations of the chromatic aberration during focusing adjacent to the telescopic end.

As in the case of Japanese Patent Laid-Open No. 05-027167, the fourth lens group includes only one positive lens in U.S. Pat. No. 6441968, and thus the chromatic aberration may not be sufficiently corrected. Moreover, the third lens group has a strong refracting power in U.S. Pat. No. 6,441,968, and accordingly, the curvature radii of positive lenses in the third lens group are small. Therefore, when the brightness at a wide-angle end is higher than F1.8, optical performance at the wide-angle end becomes more difficult to be retained satisfactorily. Furthermore, the external diameters of the lenses can become large with the aperture ratio, and the thicknesses of the lenses in the centers can be increased as the curvature radii of the positive lenses become small for ensuring the thicknesses of the lenses in the outer portions, resulting in an increment in size of the whole lens system.

When the refracting powers of the lens groups for changing magnification are enhanced in the zoom lenses, moving distance for a predetermined zoom ratio becomes short. Accordingly, high variable power (high zoom ratio) can be achieved while the total length of the lenses is reduced.

However, when the refracting powers of the lens groups are merely enhanced without appropriately setting the configurations of the lens groups, aberration fluctuation during zooming becomes large, thus making it difficult to achieve excellent optical performance over the whole variable-power range when high variable power is required.

SUMMARY OF THE INVENTION

At least one exemplary embodiment is directed to a zoom lens used in an imaging apparatus (e.g., video cameras, silver-salt film cameras, digital still cameras, and other imaging devices as known by one of ordinary skill in the relevant art).

Accordingly, at least-one exemplary embodiment is directed to compact zoom lenses having high zoom ratio and also high optical performance over the whole zoom range achieved by appropriately setting the refracting powers of the lens groups and the configurations of the lens groups and provides imaging apparatuses including the same.

At least one exemplary embodiment is directed to a zoom lens including a first lens group, which can have a positive refracting power; a second lens group, which can have a negative refracting power and can move during zooming; a third lens group, which can have a positive refracting power; and a fourth lens group, which can have a positive refracting power and can move during zooming, the lens groups being aligned in order from a front side to a rear side. The third lens group, in at least one exemplary embodiment, includes two or more positive lenses and a negative meniscus lens, which can have a convex plane facing (adjacent) to an object (side). The fourth lens group, in at least one exemplary embodiment, includes a positive lens and a negative lens. The focal lengths f3 and f4 of the third lens group L3a-c and the fourth lens group L4a-c, respectively, and the focal lengths fw and ft of the whole system at a wide-angle end and at a telescopic end, respectively, can satisfy the following conditions:

$$0.15 < fw/f4 < 0.26$$

$$1.0 < f3/(fw \cdot ft)^{1/2} < 1.2.$$

At least one exemplary embodiment is also directed to an imaging apparatus including a solid-state image-pickup device and the zoom lens according to the first exemplary embodiment for forming images on the solid-state image-pickup device.

Further features of the present invention will become apparent from the following description of exemplary embodiments with reference to the attached drawings.

DESCRIPTION OF THE EMBODIMENTS

Figure 1:
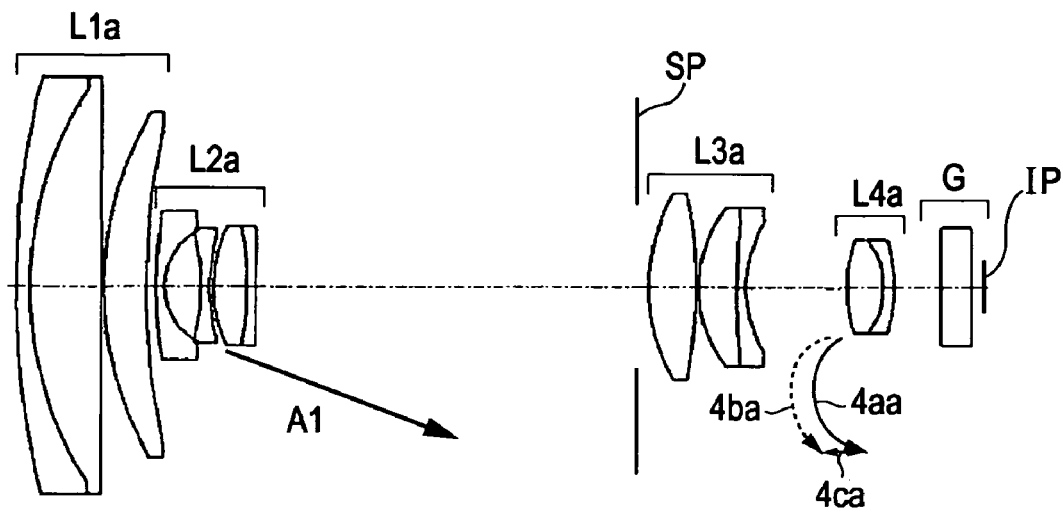
FIG. 1 is a cross-sectional view of a zoom lens according to a first exemplary embodiment at a wide-angle end.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of a zoom lens and an imaging apparatus including the same according to at least one exemplary embodiment will now be described.

Figure 2:
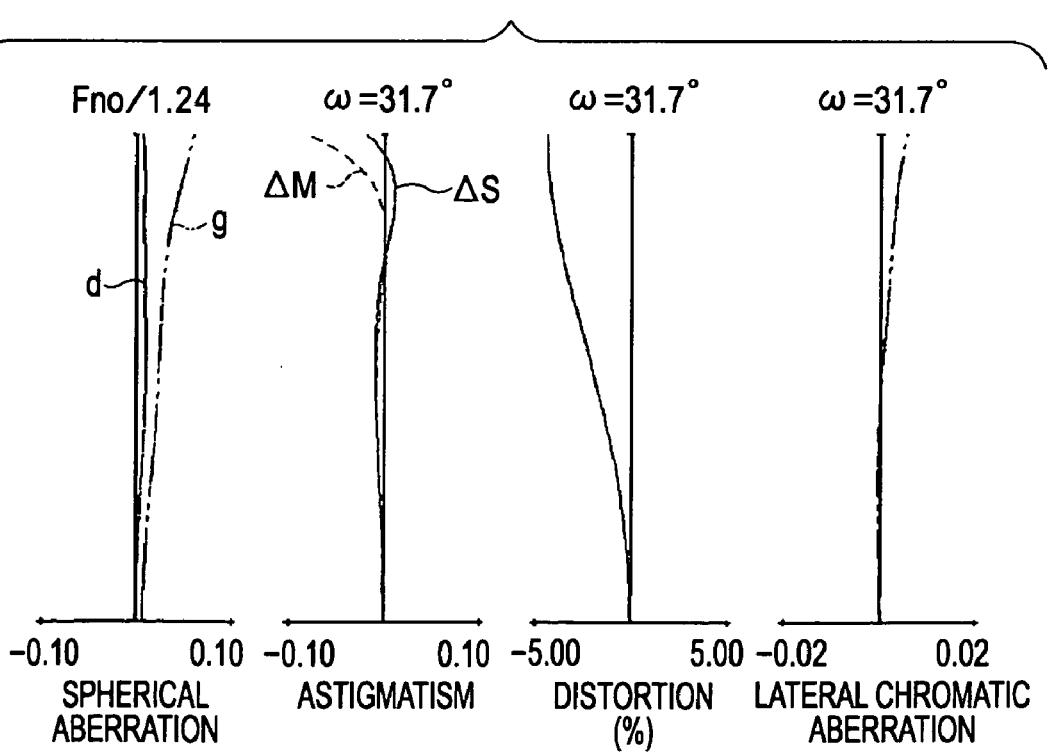
FIG. 2 illustrates aberrations of the zoom lens according to the first exemplary embodiment at the wide-angle end.
Figure 3:
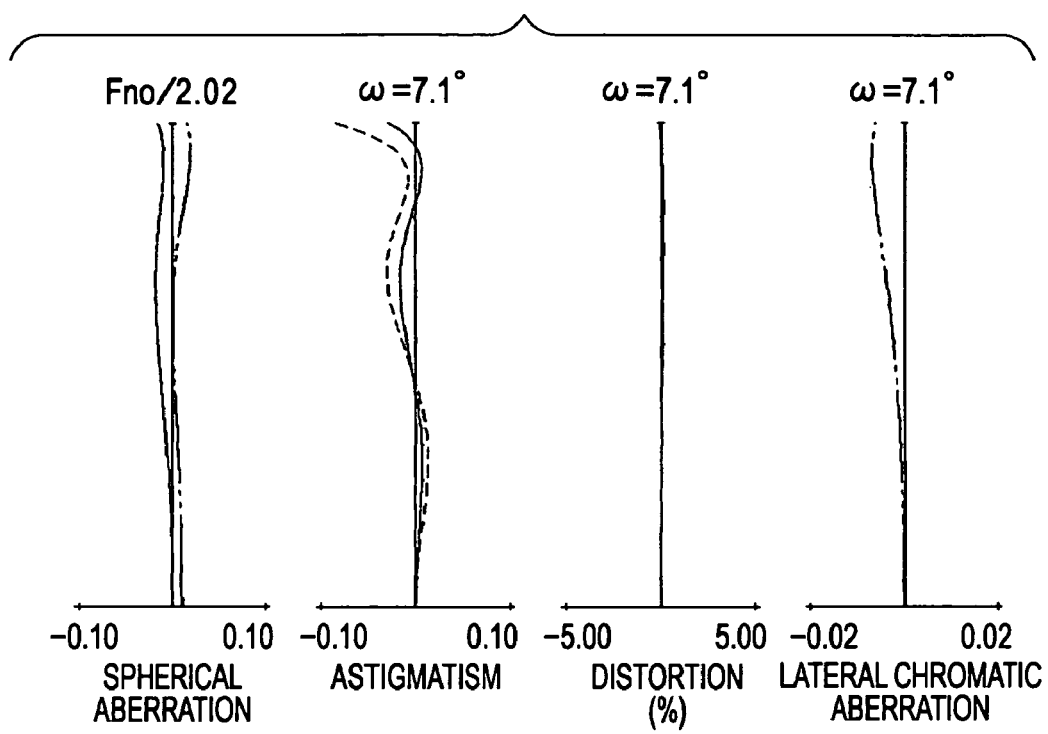
FIG. 3 illustrates the aberrations of the zoom lens according to the first exemplary embodiment at an intermediate position of a zoom range.
Figure 4:
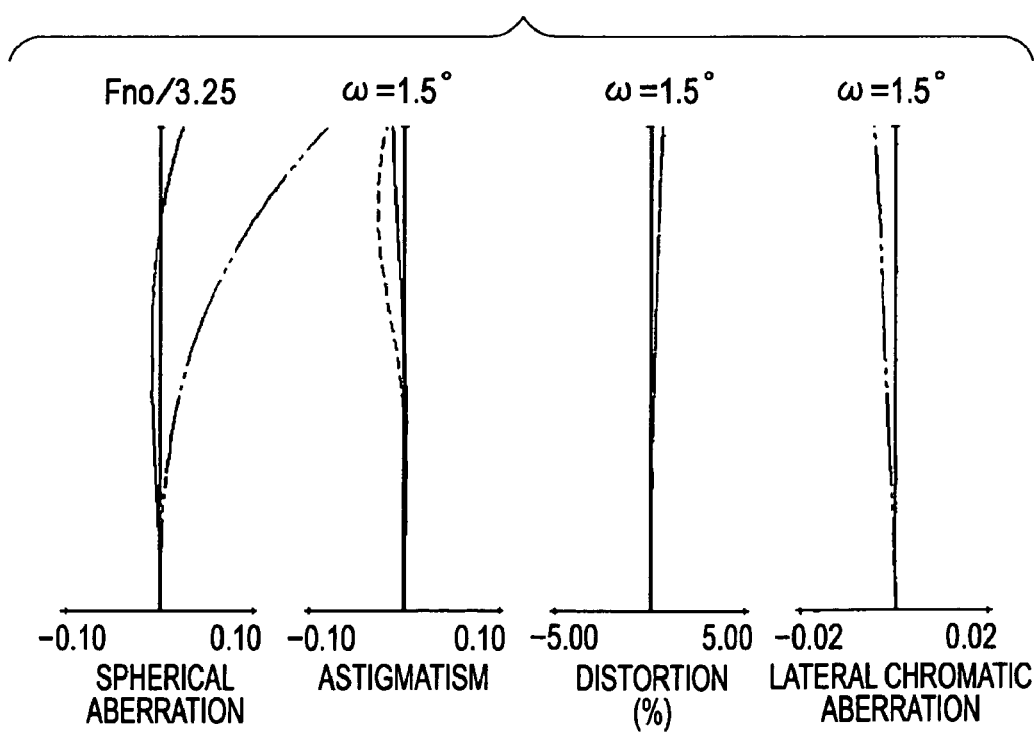
FIG. 4 illustrates the aberrations of the zoom lens according to the first exemplary embodiment at a telescopic end.

FIG. 1 is a cross-sectional view of a zoom lens according to a first exemplary embodiment at a wide-angle end. FIGS. 2, 3, and 4 illustrate aberrations of the zoom lens according to the first exemplary embodiment at the wide-angle end, at an intermediate position of a zoom range, and at a telescopic end, respectively.

Figure 5:
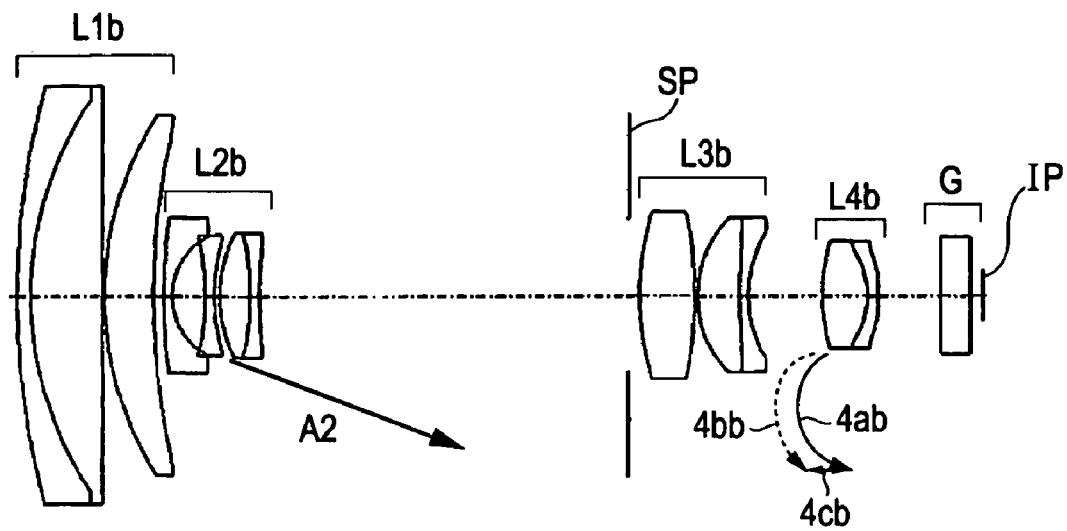
FIG. 5 is a cross-sectional view of a zoom lens according to a second exemplary embodiment at the wide-angle end.
Figure 6:
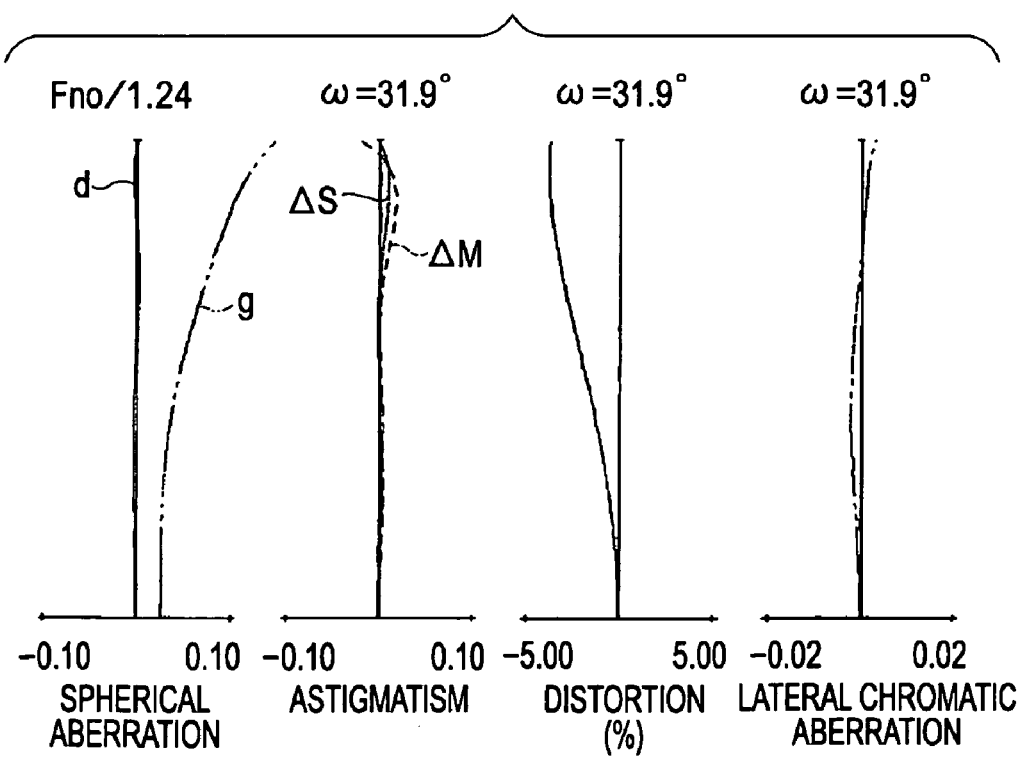
FIG. 6 illustrates the aberrations of the zoom lens according to the second exemplary embodiment at the wide-angle end.
Figure 7:
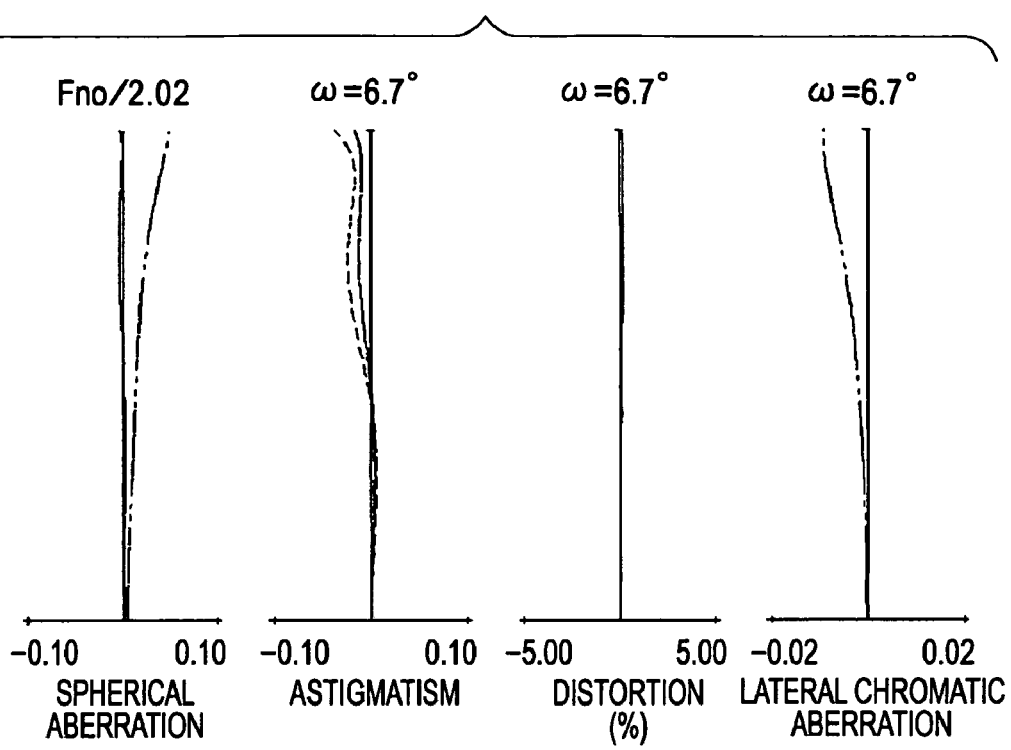
FIG. 7 illustrates the aberrations of the zoom lens according to the second exemplary embodiment at the intermediate position of the zoom range.
Figure 8:
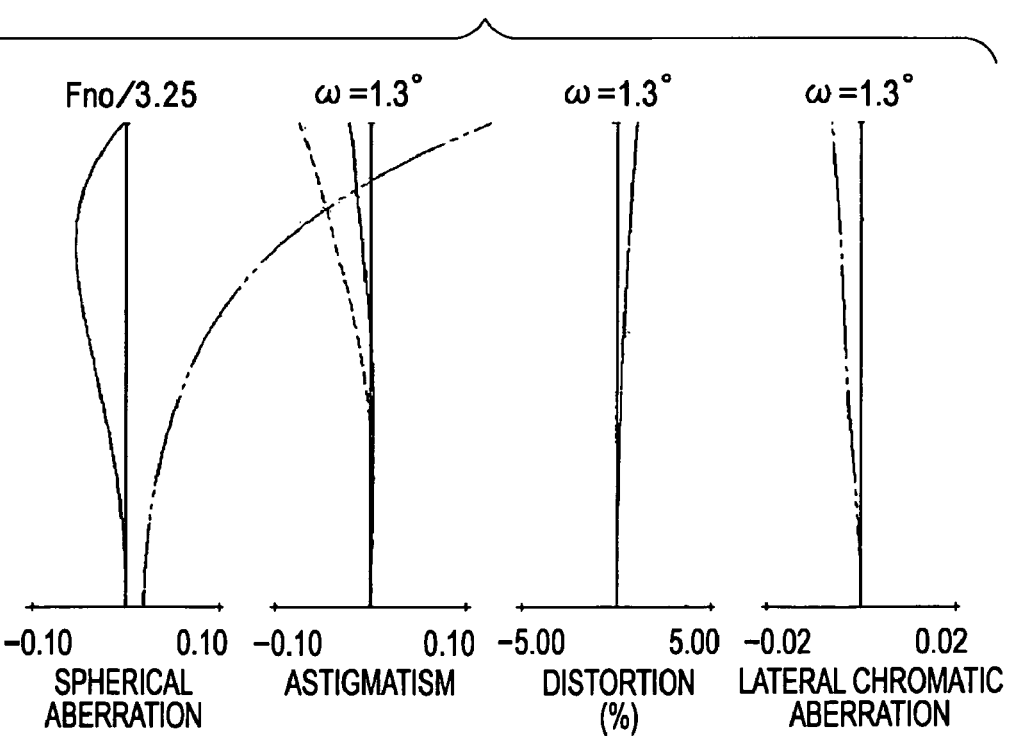
FIG. 8 illustrates the aberrations of the zoom lens according to the second exemplary embodiment at the telescopic end.

FIG. 5 is a cross-sectional view of a zoom lens according to a second exemplary embodiment at the wide-angle end. FIGS. 6, 7, and 8 illustrate the aberrations of the zoom lens according to the second exemplary embodiment at the wide-angle end, at the intermediate position of the zoom range, and at the telescopic end, respectively.

Figure 9:
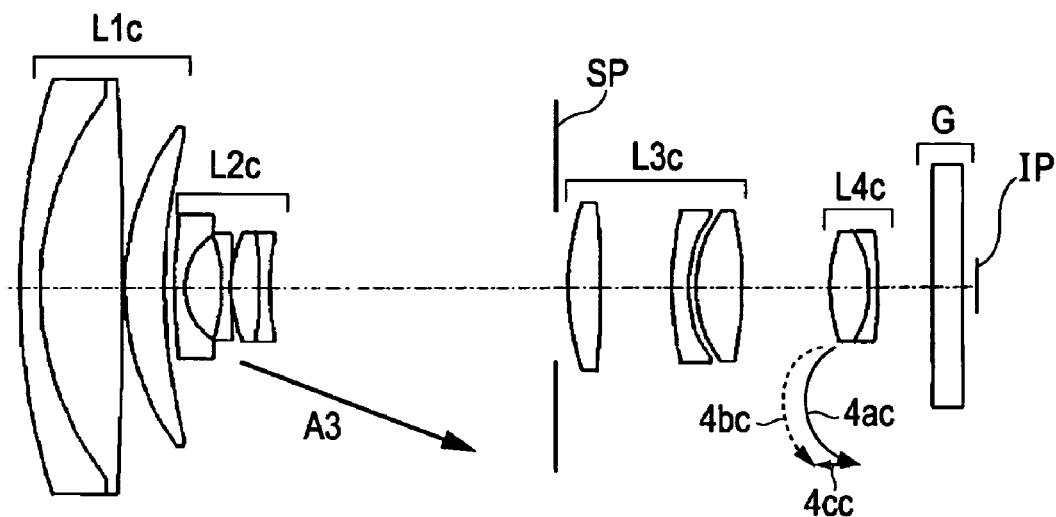
FIG. 9 is a cross-sectional view of a zoom lens according to a third exemplary embodiment at the wide-angle end.
Figure 10:
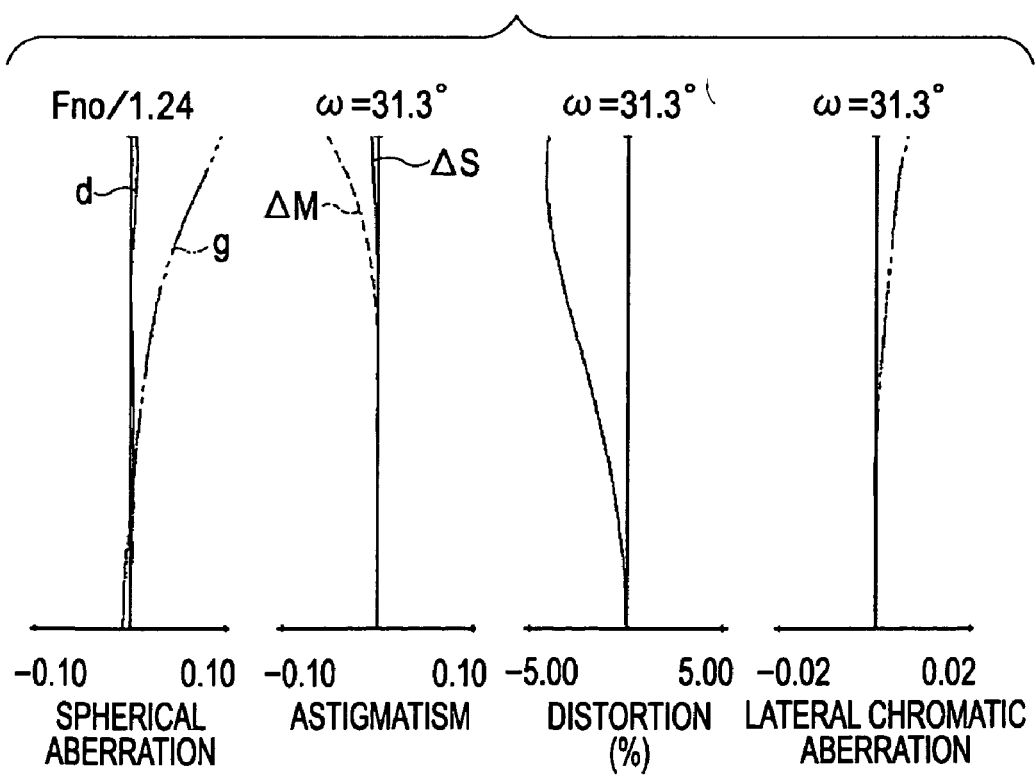
FIG. 10 illustrates the aberrations of the zoom lens according to the third exemplary embodiment at the wide-angle end.
Figure 11:
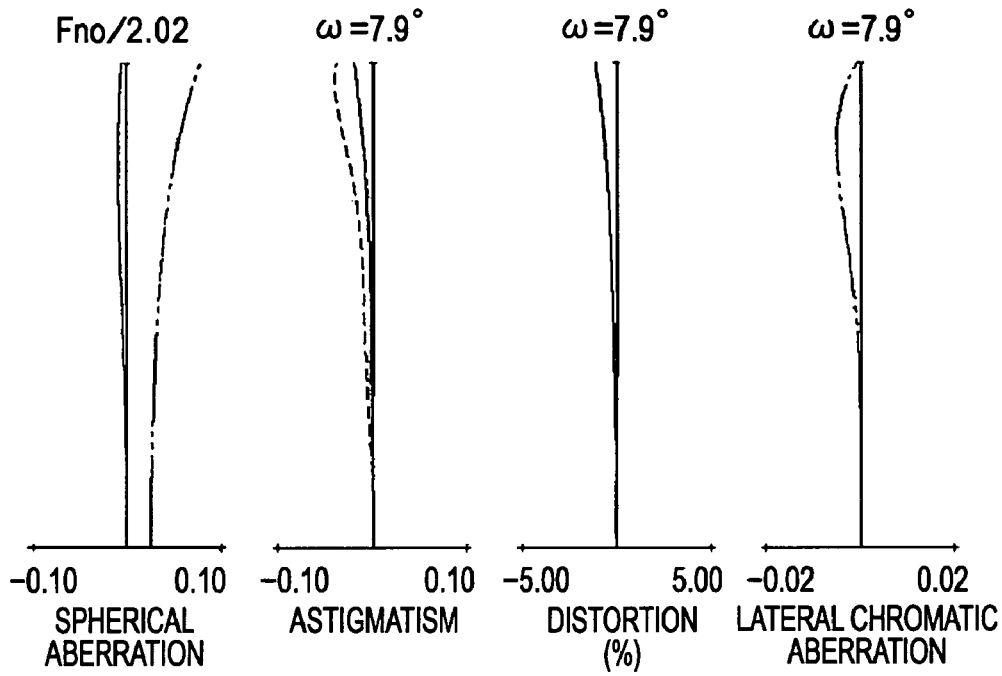
FIG. 11 illustrates the aberrations of the zoom lens according to the third exemplary embodiment at the intermediate position of the zoom range.
Figure 12:
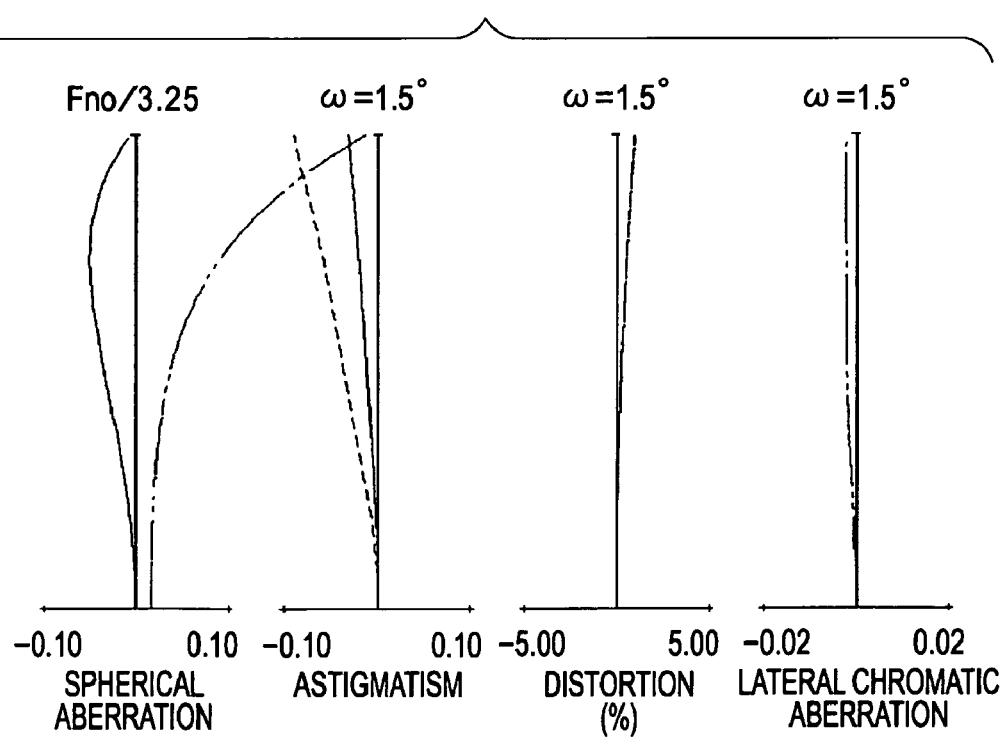
FIG. 12 illustrates the aberrations of the zoom lens according to the third exemplary embodiment at the telescopic end.

FIG. 9 is a cross-sectional view of a zoom lens according to a third exemplary embodiment at the wide-angle end. FIGS. 10, 11, and 12 illustrate the aberrations of the zoom lens according to the third exemplary embodiment at the wide-angle end, at the intermediate position of the zoom range, and at the telescopic end, respectively.

Figure 13:
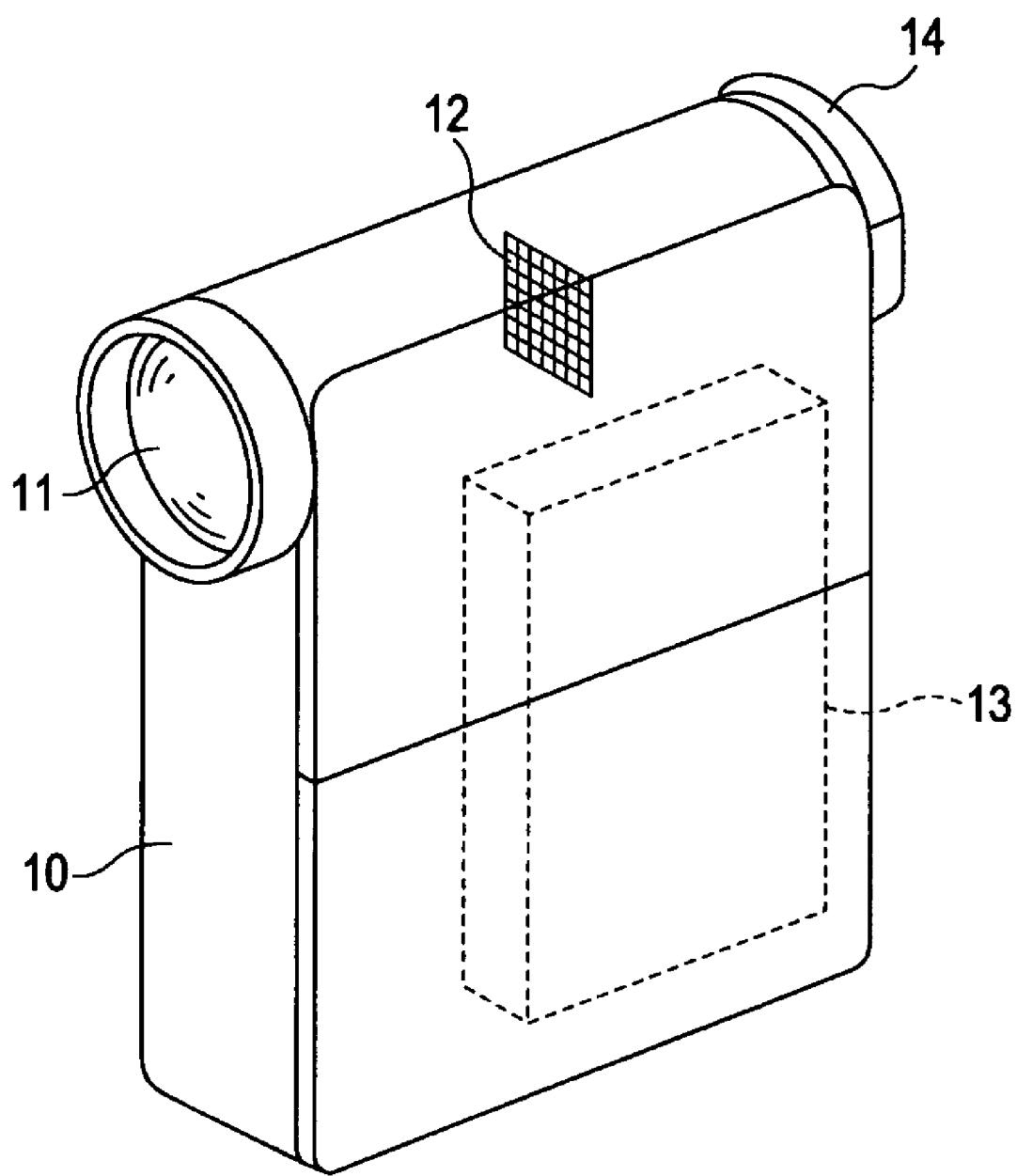
FIG. 13 is a schematic view of principal parts of an imaging apparatus according to at least one exemplary embodiment.

FIG. 13 is a schematic view of principal parts of a video camera (an example of an imaging apparatus) including the zoom lens according to at least one exemplary embodiment. The zoom lens according to the exemplary embodiments is a taking-lens system used for imaging apparatuses. In the cross-sectional views of the zoom lens, the left side is adjacent to an object (the anterior position; magnifying side; object side), and the right side is adjacent to an image taking side (the posterior position; reducing side; image side).

When the zoom lens according to the exemplary embodiments is used as a projector lens for projectors and other related or equivalent apparatus as known by one of ordinary skill in the relevant art, the left side is adjacent to a screen and the right side is adjacent to an image to be projected. In each of the cross-sectional views of the zoom lens, a first lens group L1a-c has a positive refracting power (optical power; a reciprocal of focal length), a second lens group L2a-c has a negative refracting power, a third lens group L3a-c has a positive refracting power, and a fourth lens group L4a-c has a positive refracting power. An aperture stop SP is disposed at a side of the third lens group L3a-c at the object side. In the exemplary embodiment, each lens group can include one lens or can include a plurality of lens as illustrated in FIGS. 1, 5 and 9.

An optical block G corresponds to an optical filter, a face plate, and other related or equivalent filters and/or plates as known by one of ordinary skill in the relevant art. An image plane IP corresponds to an imaging area of a solid-state image-pickup device (e.g., photoelectric transducer) such as a charge-coupled device (CCD) sensor and a complementary metal-oxide semiconductor (CMOS) sensor when the zoom lens is used as an optical imaging system of a video camera or a digital camera. The image plane IP corresponds to a film plane when the zoom lens is used as an optical imaging system of a silver-salt film camera.

In the drawings of the aberrations, reference signs d and g denote a d line and a g line, respectively; and reference signs AM and AS denote a meridional image surface and a sagittal image surface, respectively. The lateral chromatic aberration is illustrated with the g line.

In the exemplary embodiments below, the wide-angle end and the telescopic end correspond to positions at both ends of a range on an optical axis within which the lens group for changing magnification (e.g., the second lens group L2a-c) can move (e.g., A1-A3) in terms of the mechanism.

In the exemplary embodiments, during zooming from the wide-angle end to the telescopic end, the second lens group L2a-c moves toward the image taking side as indicated by an arrow so as to change magnification, while the fourth lens group L4a-c moves toward the object so as to lay down a convex trail for correcting and/or reducing the image-plane fluctuations generated by the magnification changes.

Moreover, a rear-focus type adjusting the focus by moving the fourth lens group L4a-c on the optical axis can be adopted. A solid curved line 4aa-4ac and a dotted curved line 4ba-4bc are trails of the fourth lens group L4a-c for correcting and/or reducing the image-plane fluctuations generated by the magnification changes during focusing of an object at infinity (4aa-4ac) and an object at short range (4ba-4bc), respectively. In this manner, the convex trails of the fourth lens group L4a-c toward the object can facilitate the effective use of a space between the third lens group L3a-c and the fourth lens group L4a-c, and can effectively reduce the total length of the lenses.

Furthermore, when the focus is changed from the object at infinity to the object at short range at the telescopic end, the fourth lens group L4a-c advances as indicated by an arrow 4ca-4cc.

The first lens group L1a-c, the third lens group L3a-c, and the aperture stop SP do not move in the optical-axis direction for zooming and focusing; but can move to correct and/or reduce the aberrations.

In the exemplary embodiments of the zoom lens, the first lens group L1a-c includes two or more positive lenses. For example, the first lens group L1a-c can include a combination (e.g., cemented) lens formed by joining a negative meniscus lens (a lens having a negative refracting power), which can have a convex plane facing (adjacent) to the object (side) and a positive lens (a lens having a positive refracting power), and a positive meniscus lens, which can have a convex plane at the object side, the lenses being aligned in order from the object side to the image (taking) side.

The second lens group L2a-c can include three or less negative lenses. Specifically, the second lens group L2a-c includes a negative lens whose absolute value of the refracting power at a plane at the image side is larger than that at the other plane at the object side, a negative lens, which can have a concave plane at the object side, and a cemented lens formed by joining a positive lens, which can have a convex plane at the object side and a negative lens, the lenses being aligned in order from the object side to the image taking side.

With this configuration of the second lens group L2a-c, aberrations such as field curvature and distortion fluctuated during zooming can be appropriately corrected and/or reduced.

The third lens group L3a-c can include two or more positive lenses and a negative meniscus lens, which can have a convex plane at the object side. The two or more positive lenses include at least one lens having an aspheric surface.

The fourth lens group L4a-c includes at least one positive lens and a negative lens.

In particular, the fourth lens group L4a-c includes a combination (e.g., cemented) lens formed by joining the positive lens having convex planes protruding toward both the object and the image taking side and the negative meniscus lens, which can have a convex plane at the image side.

With this configuration, the fluctuation of the aberrations, in particular, the chromatic aberration, during focusing with the fourth lens group L4a-c can be regulated.

As can be seen, in the exemplary embodiments of the zoom lens, the aperture ratio (reciprocal of F-number) at the wide-angle end is determined by an effective diameter of the third lens group L3a-c or the vicinity. Accordingly, the effective diameter of the third lens group L3a-c becomes large as the aperture ratio is increased (as the F-number is reduced). To avoid this, the third lens group L3a-c can include two positive lenses so as to separate the whole refracting power of the third lens group L3a-c, and includes at least one aspheric surface in the positive lenses. Thus, the curvature radii of the planes of the positive lenses in the third lens group L3a-c become gentle even though the aperture ratio of the whole system is increased. Thus, mainly the spherical aberration can be appropriately corrected.

Moreover, the negative lens is provided for the third lens group L3a-c in order to correct and/or reduce the longitudinal chromatic aberration at the wide-angle end. The negative lens is a meniscus lens, which can have the convex plane at the object side. Thus, the angles of light rays passing through positions remote from the optical axis and entering the negative lens in the third lens group L3a-c become gentle even though the aperture ratio of the whole system is large. Thus, occurrence of flare is regulated.

According to the exemplary embodiments, the lens groups, which can have the above-described structures, can reduce the size of the whole lens system, and can achieve high optical performance over the whole zoom range and the whole object distance with the simplified lens configuration.

Next, features not described in the exemplary embodiments above will be described.

The focal lengths f3 and f4 of the third lens group L3a-c and the fourth lens group L4a-c, respectively, and the focal lengths fw and ft of the whole system at the wide-angle end and at the telescopic end, respectively, can satisfy the following conditions:

$$0.15 < fw/f4 < 0.26 \quad (1)$$

$$1.0 < f3/(fw \cdot ft)^{1/2} < 1.2 \quad (2)$$

The focal length of the lens group having a positive refracting power is positive, and the focal length of the lens group having a negative refracting power is negative. The conditional expression (1) is to define the length from the last plane of the fourth lens group L4a-c to the image plane. When the focal length of the fourth lens group L4a-c is too small such that fw/f4 exceeds the upper limit of the conditional expression (1), the back focus becomes short. Thus, spaces for a face plate disposed on a solid-state image-pickup device and a low-pass filter that regulates the occurrence of moire fringes can become deficient. Moreover, since the amounts of the aberrations generated in the fourth lens group L4a-c are increased, the number of lenses and the number of aspherical lenses need to be increased. In contrast, when fw/f4 is smaller than the lower limit, the back focus becomes too long and the whole length of the lenses becomes large. Besides, when the fourth lens group L4a-c corrects the image plane while the magnification is changed, the distance between the third lens group L3a-c and the fourth lens group L4a-c becomes short during changing of the magnification, and thus spaces for a barrel and light-shielding members become deficient.

The conditional expression (2) is to achieve high aperture ratio while the occurrence of the aberrations is regulated. When the focal length of the third lens group L3a-c becomes large such that $f3/(fw \cdot ft)^{1/2}$ exceeds the upper limit of the conditional expression (2), the whole length of the lenses is increased. In contrast, when the focal length of the third lens group L3a-c becomes too small such that $f3/(fw \cdot ft)^{1/2}$ is smaller than the lower limit, the spherical aberration and the longitudinal chromatic aberration mainly at the wide-angle end become difficult to be corrected.

In at least one exemplary embodiment, the ranges of the numerical values for the conditional expressions (1) and (2) can be set as below:

$$0.18 < fw/f4 < 0.25 \quad (1a)$$

$$1.05 < f3/(fw \cdot ft)^{1/2} < 1.18 \quad (2a)$$

The focal lengths f1 and f2 of the first lens group L1a-c and the second lens group L2a-c, respectively, can satisfy the following conditions:

$$9.4 < f1/fw < 13.3 \quad (3)$$

$$-7.0 < f1/f2 < -6.2 \quad (4)$$

The conditional expression (3) is to ensure a reasonably high zoom ratio. According to the exemplary embodiments of the zoom lens, excellent optical performance with high aperture ratio is difficult to be achieved by shortening the focal length of the third lens group L3a-c as described in the explanation of the conditional expression (2).

In the exemplary embodiments, the second lens group L2a-c moves from the object side to the image taking side so as to zoom from the wide-angle end to the telescopic end. In order to achieve high zoom ratio with a zoom lens of this type, the movable distance of the second lens group L2a-c during zooming can be increased. Thus, the angles of the light rays emitted from the second lens group L2a-c, which can have a negative refracting power become gentle at the wide-angle end, and accordingly, the back focus is not too long even though the focal length of the third lens group L3a-c, which can have a positive refracting power, is large. Thus, the whole length from the third lens group L3a-c to the image plane is not required to be large. That is to say, the zoom lens having high aperture ratio and capable of appropriately correcting and/or reducing the aberrations has little need for longer focal lengths of the third lens group L3a-c and the fourth lens group L4a-c for achieving high zoom ratio. Thus, less increment in the whole length other than that for ensuring the movable distance of the second lens group L2a-c takes place for achieving high zoom ratio. When the focal length of the first lens group L1a-c becomes too large such that f1/fw exceeds the upper limit of the conditional expression (3), the effect of the variable power generated when the second lens group L2a-c moves is weakened. Thus, the moving distance of the second lens group L2a-c can be increased for ensuring a reasonably high zoom ratio, resulting in an increment in the whole length of the lenses. In contrast, when the focal length of the first lens group L1a-c becomes too small such that f1/fw is smaller than the lower limit, the spherical aberration and the longitudinal chromatic aberration at the telescopic end, the aberrations being corrected mainly by the first lens group L1a-c, are deteriorated.

The conditional expression (4) is to control the focal length at the wide-angle end. When the refracting power of the second lens group L2a-c is reduced such that f1/f2 exceeds the upper limit of the conditional expression (4), the longitudinal chromatic aberration generated by the first lens group L1a-c at the telescopic end becomes difficult to be cancelled. In contrast, when f1/f2 is smaller than the lower limit, the angle of view at the wide-angle end becomes too wide, resulting in a large effective diameter of the first lens group L1a-c.

In at least one exemplary embodiment, the ranges of the numerical values for the conditional expressions (3) and (4) can be set as below:

$$9.5 < f1/fw < 13.0 \tag{3a}$$

$$-6.8 < f1/f2 < -6.3 \tag{4a}$$

The focal lengths fw and ft of the whole system at the wide-angle end and at the telescopic end, respectively, satisfy the following condition:

$$21.5 < ft/fw < 29.5 \tag{5}$$

The conditional expression (5) specifies a range of the zoom where the aberrations are appropriately corrected and/or reduced over the whole zoom range for higher variable power.

When ft/fw exceeds the upper limit of the conditional expression (5), the aberration fluctuation generated during zooming can become difficult to be appropriately corrected.

In contrast, when ft/fw is smaller than the lower limit, the zoom ratio is disadvantageously insufficient as an imaging system for an imaging apparatus (e.g., a video camera and a digital camera).

In at least one exemplary embodiment, the range of the numerical values for the conditional expression (5) can be set as below:

$$22 < ft/fw < 28.5 \tag{5a}$$

According to the exemplary embodiments, a zoom lens of a rear-focus type having high brightness of approximately F1.2 yet having high zoom ratio of approximately 22 to 29 times can be achieved by specifying the configurations as above.

Numerical Examples 1 to 3 corresponding to the first to third exemplary embodiments, respectively, will be described below. In the numerical examples, i, Ri, Di, Ni, and vi, indicate the order of the planes from the object side, the ith curvature radius (of the ith plane), the spacing between the ith plane and the (i+1)th plane, the refractive index with respect to the d line, and the Abbe number with respect to the d line, respectively.

In Numerical Examples 1 to 3, the two planes closest to the image taking side correspond to the planes of the optical block. The displacement x in the optical-axis direction at a height h from the optical axis with respect to the vertex of the plane of the aspheric surface can be expressed by equation (6):

$$x = \frac{(1/R)h^2}{1 + \sqrt{\{1-(1+k)(h/R)^2\}}} + Bh^4 + Ch^6 + Dh^8 + Eh^{10} + A'h^3 + B'h^5 + C'h^7 + D'h^9 + E'h^{11} \tag{6}$$

Where R and k indicate a paraxial curvature radius and a conic constant, respectively; and A, B, B', C, C', D, D', E, and E' are aspherical coefficients.

Also, a mark "e-X" means "$\times 10^{-X}$". f, Fno, and ω indicate the focal length, the F-number, and the half-angle of view, respectively. Relationships between the above-described conditional expressions and the numerical values in the numerical examples are shown in Table 1.

| Numerical Example 1 |||||
|---|---|---|---|
| f = 3.80–91.06 Fno = 1.24–3.25 2ω = 63.5°–3.0° ||||
| R1 = 79.486 | D1 = 1.30 | N1 = 1.846660 | v1 = 23.9 |
| R2 = 33.876 | D2 = 6.70 | N2 = 1.729157 | v2 = 54.7 |
| R3 = −4788.459 | D3 = 0.20 | N3 = 1.804000 | v3 = 46.6 |

-continued

Numerical Example 1

| | | | |
|---|---|---|---|
| R4 = 32.723 | D4 = 3.85 | N4 = 1.834807 | ν4 = 42.7 |
| R5 = 68.190 | D5 = variable | N5 = 1.834807 | ν5 = 42.7 |
| R6 = 37.464 | D6 = 0.80 | N6 = 1.846660 | ν6 = 23.9 |
| R7 = 6.065 | D7 = 3.35 | N7 = 1.788001 | ν7 = 47.4 |
| R8 = −19.972 | D8 = 0.80 | N8 = 1.693500 | ν8 = 53.2 |
| R9 = 19.972 | D9 = 0.35 | N9 = 1.487490 | ν9 = 70.2 |
| R10 = 13.430 | D10 = 3.10 | N10 = 1.846660 | ν10 = 23.9 |
| R11 = −27.165 | D11 = 0.80 | N11 = 1.589130 | ν11 = 61.3 |
| R12 = 226.056 | D12 = variable | N12 = 1.834000 | ν12 = 37.2 |
| R13 = aperture | D13 = 1.00 | N13 = 1.516330 | ν13 = 64.1 |
| R14 = 17.269 | D14 = 4.35 | | |
| R15 = −38.585 | D15 = 0.20 | | |
| R16 = 12.205 | D16 = 3.50 | | |
| R17 = 74.783 | D17 = 0.80 | | |
| R18 = 11.496 | D18 = variable | | |
| R19 = 14.868 | D19 = 3.25 | | |
| R20 = −7.683 | D20 = 1.00 | | |
| R21 = −15.480 | D21 = variable | | |
| R22 = ∞ | D22 = 2.77 | | |
| R23 = ∞ | | | |

Focal length

| Variable spacing | 3.80 | 18.99 | 91.06 |
|---|---|---|---|
| D5 | 0.90 | 24.36 | 34.42 |
| D12 | 35.10 | 11.64 | 1.58 |
| D18 | 9.32 | 4.22 | 9.72 |
| D21 | 4.38 | 9.49 | 3.99 |

Aspherical coefficient

| | | | | | |
|---|---|---|---|---|---|
| R14 | k = −2.34033e+00 | B = 0.00000e+00 | C = 0.00000e+00 | D = 0.00000e+00 | E = 0.00000e+00 |
| | A' = 9.69539e−05 | B' = 3.41867e−06 | C' = 3.44128e−08 | D' = −6.50409e−10 | E' = 0.00000e+00 |
| R15 | k = 8.94287e+00 | B = 0.00000e+00 | C = 0.00000e+00 | D = 0.00000e+00 | E = 0.00000e+00 |
| | A' = 1.09047e−04 | B' = 7.93406e−06 | C' = −1.99612e−08 | D' = −2.96090e−10 | E' = 0.00000e+00 |
| R19 | k = −2.61702e−01 | B = −5.16748e−05 | C = 4.19084e−06 | D = −3.70955e−07 | E = 1.24518e−08 |
| | A' = 0.00000e+00 | B' = 0.00000e+00 | C' = 0.00000e+00 | D' = 0.00000e+00 | E' = 0.00000e+00 |

Numerical Example 2 f = 3.77–105.51  Fno = 1.24–3.25  2ω = 63.9°–2.5°

| | | | |
|---|---|---|---|
| R1 = 74.352 | D1 = 1.30 | N1 = 1.846660 | ν1 = 23.9 |
| R2 = 33.006 | D2 = 6.58 | N2 = 1.712995 | ν2 = 53.9 |
| R3 = −1126676.036 | D3 = 0.20 | N3 = 1.772499 | ν3 = 49.6 |
| R4 = 32.440 | D4 = 4.45 | N4 = 1.834807 | ν4 = 42.7 |
| R5 = 72.681 | D5 = variable | N5 = 1.785896 | ν5 = 44.2 |
| R6 = 48.402 | D6 = 0.80 | N6 = 1.846660 | ν6 = 23.9 |
| R7 = 6.423 | D7 = 2.99 | N7 = 1.785896 | ν7 = 44.2 |
| R8 = −24.060 | D8 = 0.80 | N8 = 1.693500 | ν8 = 53.2 |
| R9 = 19.819 | D9 = 0.47 | N9 = 1.487490 | ν9 = 70.2 |
| R10 = 13.107 | D10 = 2.88 | N10 = 1.846660 | ν10 = 23.9 |
| R11 = −24.411 | D11 = 0.80 | N11 = 1.583126 | ν11 = 59.4 |
| R12 = 53.486 | D12 = variable | N12 = 1.834000 | ν12 = 37.2 |
| R13 = aperture | D13 = 1.00 | N13 = 1.516330 | ν13 = 64.1 |
| R14 = 25.320 | D14 = 5.00 | | |
| R15 = −40.242 | D15 = 0.20 | | |
| R16 = 10.456 | D16 = 3.93 | | |
| R17 = 92.727 | D17 = 0.80 | | |
| R18 = 12.011 | D18 = variable | | |
| R19 = 15.447 | D19 = 4.22 | | |
| R20 = −7.918 | D20 = 1.00 | | |
| R21 = −13.697 | D21 = variable | | |
| R22 = ∞ | D22 = 2.77 | | |
| R23 = ∞ | | | |

Numerical Example 2

Focal length

| Variable spacing | 3.77 | 19.99 | 105.51 |
|---|---|---|---|
| D5 | 0.90 | 23.72 | 33.50 |
| D12 | 34.17 | 11.35 | 1.57 |
| D18 | 6.78 | 2.65 | 10.74 |
| D21 | 5.81 | 9.93 | 1.85 |

Aspherical coefficient

| | | | | | |
|---|---|---|---|---|---|
| R14 | k = −3.66039e+00 | B = 0.00000e+00 | C = 0.00000e+00 | D = 0.00000e+00 | E = 0.00000e+00 |
| | A' = 4.52042e−05 | B' = −5.93818e−07 | C' = −3.39414e−09 | D' = −3.16040e−10 | E' = 0.00000e+00 |
| R15 | k = 1.16946e+01 | B = 0.00000e+00 | C = 0.00000e+00 | D = 0.00000e+00 | E = 0.00000e+00 |
| | A' = 8.10602e−05 | B' = 3.65620e−06 | C' = −3.63801e−08 | D' = 1.14272e−11 | E' = 0.00000e+00 |
| R19 | k = −8.48389e−01 | B = −8.61183e−05 | C = −6.67448e−07 | D = 1.70291e−08 | E = 0.00000e+00 |
| | A' = 0.00000e+00 | B' = 0.00000e+00 | C' = 0.00000e+00 | D' = 0.00000e+00 | E' = 0.00000e+00 |

Numerical Example 3 f = 3.87–86.90 Fno = 1.24–3.25 2ω = 62.5° = 3.1°

| | | | |
|---|---|---|---|
| R1 = 60.018 | D1 = 1.80 | N1 = 1.846660 | ν1 = 23.9 |
| R2 = 27.817 | D2 = 7.26 | N2 = 1.696797 | ν2 = 55.5 |
| R3 = −385.237 | D3 = 0.20 | N3 = 1.712995 | ν3 = 53.9 |
| R4 = 24.146 | D4 = 3.49 | N4 = 1.882997 | ν4 = 40.8 |
| R5 = 52.924 | D5 = variable | N5 = 1.743997 | ν5 = 44.8 |
| R6 = 51.281 | D6 = 0.90 | N6 = 1.846660 | ν6 = 23.9 |
| R7 = 5.591 | D7 = 3.24 | N7 = 1.684088 | ν7 = 56.4 |
| R8 = −15.172 | D8 = 0.80 | N8 = 1.693500 | ν8 = 53.2 |
| R9 = 56.130 | D9 = 0.00 | N9 = 1.846660 | ν9 = 23.9 |
| R10 = 11.442 | D10 = 2.51 | N10 = 1.516330 | ν10 = 64.1 |
| R11 = −30.295 | D11 = 0.80 | N11 = 1.701536 | ν11 = 41.2 |
| R12 = 19.067 | D12 = variable | N12 = 1.846660 | ν12 = 23.9 |
| R13 = aperture | D13 = 1.10 | N13 = 1.516330 | ν13 = 64.2 |
| R14 = 22.164 | D14 = 2.81 | | |
| R15 = −71.082 | D15 = 6.14 | | |
| R16 = 29.261 | D16 = 1.40 | | |
| R17 = 11.415 | D17 = 0.70 | | |
| R18 = 11.449 | D18 = 3.97 | | |
| R19 = −30.676 | D19 = variable | | |
| R20 = 14.867 | D20 = 3.40 | | |
| R21 = −9.503 | D21 = 0.80 | | |
| R22 = −43.709 | D22 = variable | | |
| R23 = ∞ | D23 = 2.77 | | |
| R24 = ∞ | | | |

Focal length

| Variable spacing | 3.87 | 16.88 | 86.90 |
|---|---|---|---|
| D5 | 0.87 | 17.44 | 24.54 |
| D12 | 25.06 | 8.49 | 1.38 |
| D19 | 7.65 | 3.39 | 10.58 |
| D22 | 4.78 | 9.03 | 1.84 |

Aspherical coefficient

| | | | | | |
|---|---|---|---|---|---|
| R14 | k = −6.03456e+00 | B = 2.80820e−05 | C = −1.78090e−07 | D = 0.00000e+00 | E = 0.00000e+00 |
| | A' = 0.00000e+00 | B' = 0.00000e+00 | C' = 0.00000e+00 | D' = 0.00000e+00 | E' = 0.00000e+00 |

TABLE 1

| Conditional expression | Numerical example 1 | 2 | 3 |
|---|---|---|---|
| (1) | 0.226 | 0.240 | 0.196 |
| (2) | 1.11 | 1.17 | 1.07 |
| (3) | 12.88 | 12.71 | 9.65 |
| (4) | −6.75 | −6.47 | −6.36 |
| (5) | 23.96 | 27.99 | 22.45 |

Next, an exemplary embodiment of a video camera using the zoom lens according to at least one exemplary embodiment as an optical imaging system will be described with reference to FIG. 13.

As illustrated in FIG. 13; the video camera includes a body 10, an optical imaging system 11 formed of the zoom lens according to at least one exemplary embodiment, a solid-state image-pickup device 12 (e.g., photoelectric transducer, a CCD sensor, a CMOS sensor, and other image-pickup devices as known by one of ordinary skill in the relevant arts and equivalents) receiving light rays of object images by a device configured to the optical imaging system 11, a memory 13 for recording information corresponding to the object images whose light energy is converted into electrical energy by the solid-state image-pickup device 12, and a finder 14 for observing the object images displayed on a displaying component (not shown). The displaying component can be formed of a liquid-crystal panel or other related or equivalent displaying apparatus and/or methods as known by one of ordinary skill in the relevant art, and the object images formed on the solid-state image-pickup device 12 are displayed thereon.

The zoom lens according to at least one exemplary embodiment is also applicable to digital still cameras.

The zoom lens according to at least one exemplary embodiment applied to imaging apparatuses such as video cameras and digital still cameras in this manner can realize small imaging apparatuses having high optical performance. As a matter of course, the zoom lens according to at least one exemplary embodiment is also applicable to projection devices such as liquid-crystal projectors.

According to the above-described exemplary embodiments, compact zoom lenses and optical apparatuses such as imaging apparatuses having high zoom ratio and high optical performance over the whole zoom range can be obtained.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims the benefit of Japanese Application No. 2005-113465 filed Apr. 11, 2005, which is hereby incorporated by reference herein in its entirety.

What is claimed is:

1. A zoom lens comprising:
a first lens group having a positive refracting power;
a second lens group having a negative refracting power and moving during zooming;
a third lens group having a positive refracting power; and
a fourth lens group having a positive refracting power and moving during zooming, the lens groups being aligned in order from front side to rear side, wherein
the third lens group comprises two or more positive lenses and a negative meniscus lens having a convex surface facing the front side;
the fourth lens group comprises a positive lens and a negative lens; and
the focal lengths f3 and f4 of the third lens group and the fourth lens group respectively, and the focal lengths fw and ft of the zoom lens system at a wide-angle end and at a telephoto end, respectively, satisfy the following conditions:

$0.15 < fw/f4 < 0.26$ $1.0 < f3/(fw \cdot ft)^{1/2} < 1.2$.

2. The zoom lens according to claim 1, wherein the focal lengths f1 and f2 of the first lens group and the second lens group, respectively, satisfy the following conditions:

$9.4 < f1/fw < 13.3$ $-7.0 < f1/f2 < -6.2$.

3. The zoom lens according to claim 1, wherein the following condition:

$21.5 < ft/fw < 29.5$ is satisfied.

4. The zoom lens according to claim 1, wherein the two or more positive lenses in the third lens group comprise at least one lens having an aspheric surface.

5. The zoom lens according to claim 1, wherein the first lens group is fixed during zooming.

6. The zoom lens according to claim 1, wherein the third lens group is fixed during zooming.

7. An imaging apparatus comprising:
a solid-state image-pickup device; and
a zoom lens for forming an image of an object on the solid-state image-pickup device,
wherein the zoom lens includes:
a first lens group having a positive refracting power;
a second lens group having a negative refracting power and moving during zooming;
a third lens group having a positive refracting power; and
a fourth lens group having a positive refracting power and moving during zooming, the lens groups being aligned in order from an object side to an image-pickup side, wherein
the third lens group comprises two or more positive lenses and a negative meniscus lens having a convex surface facing to the object side;
the fourth lens group comprises a positive lens and a negative lens; and
the focal lengths f3 and f4 of the third lens group and the fourth lens group, respectively, and the focal lengths fw and ft of the whole system at a wide-angle end and at a telephoto end, respectively, satisfy the following conditions:

$0.15 < fw/f4 < 0.26$ $1.0 < f3/(fw \cdot ft)^{1/2} < 1.2$.

8. The zoom lens according to claim 1, wherein the second lens group moves for zooming and the fourth lens group moves for focusing and to reduce image plane fluctuations.

9. The zoom lens according to claim 8, wherein the third lens group and the first lens group move to reduce aberration error.

* * * * *